US010254627B2

(12) United States Patent
Lee et al.

(10) Patent No.: US 10,254,627 B2
(45) Date of Patent: Apr. 9, 2019

(54) VOICE COIL MOTOR

(71) Applicant: LG INNOTEK CO., LTD., Seoul (KR)

(72) Inventors: Seong Min Lee, Seoul (KR); Sang Ok Park, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/027,927

(22) Filed: Jul. 5, 2018

(65) Prior Publication Data

US 2018/0314133 A1   Nov. 1, 2018

Related U.S. Application Data

(63) Continuation of application No. 15/788,494, filed on Oct. 19, 2017, now Pat. No. 10,048,569, which is a
(Continued)

(30) Foreign Application Priority Data

Nov. 30, 2011 (KR) ................. 10-2011-0126639

(51) Int. Cl.
*G02B 7/02* (2006.01)
*G03B 3/10* (2006.01)
(Continued)

(52) U.S. Cl.
CPC ............... *G03B 3/10* (2013.01); *G02B 7/04* (2013.01); *G02B 7/08* (2013.01); *H02K 41/0356* (2013.01)

(58) Field of Classification Search
CPC ............. G02B 7/04; G02B 7/08; H02K 41/02
See application file for complete search history.

(56) References Cited

U.S. PATENT DOCUMENTS 8,068,295 B2   11/2011  Park et al.
8,922,919 B2 * 12/2014  Park ................... G02B 7/08
                                                  359/824

(Continued)

FOREIGN PATENT DOCUMENTS

JP    2010-061030 A   3/2010
JP    2011-102823 A   5/2011
JP       4919422 B2   4/2012

OTHER PUBLICATIONS

Office Action dated Feb. 5, 2018 in Korean Application No. 10-2011-0126639.

*Primary Examiner* — Joseph P Martinez
(74) *Attorney, Agent, or Firm* — Saliwanchik, Lloyd & Eisenschenk

(57) ABSTRACT

A VCM is disclosed, the VCM including a rotor having a first driving unit and arranged therein with a lens, a stator having a second driving unit wrapping the first driving unit and being opposite to the first driving unit, a base supporting the stator and having an opening formed at a position corresponding to that of the lens, a connection terminal including a pair of first and second connection terminals arranged at an upper surface of the base, and an elastic member including a first elastic member coupled to the rotor and electrically connected the first connection terminal and a second elastic member coupled to the rotor and electrically connected the second connection terminal.

20 Claims, 5 Drawing Sheets

Related U.S. Application Data continuation of application No. 14/861,283, filed on Sep. 22, 2015, now Pat. No. 9,829,768, which is a continuation of application No. 13/686,699, filed on Nov. 27, 2012, now Pat. No. 9,170,393.

(51) Int. Cl.
*G02B 7/04* (2006.01)
*G02B 7/08* (2006.01)
*H02K 41/035* (2006.01)

(56) References Cited

U.S. PATENT DOCUMENTS

2010/0002317 A1   1/2010  Osaka et al.
2014/0368938 A1  12/2014  Park et al.

\* cited by examiner

VOICE COIL MOTOR

CROSS-REFERENCE TO RELATED APPLICATIONS

This application is a continuation of U.S. application Ser. No. 15/788,494, filed Oct. 19, 2017; which is a continuation of U.S. application Ser. No. 14/861,283, filed Sep. 22, 2015, now U.S. Pat. No. 9,829,768, issued Nov. 28, 2017; which is a continuation of U.S. application Ser. No. 13/686,699, filed Nov. 27, 2012, now U.S. Pat. No. 9,170,393, issued Oct. 27, 2015; which claims the benefit under 35 U.S.C. § 119 of Korean Patent Application No. 10-2011-0126639, filed Nov. 30, 2011, which are hereby incorporated by reference in their entirety.

BACKGROUND OF THE INVENTION

Field of the Invention

The present disclosure relates to a VCM (Voice Coil Motor).

Description of Related Art

Recently, a camera module generating a digital image or a video is widely used on a mobile phone, a gamer and a tablet computer.

A conventional camera module includes an image sensor module converting an outside light to a digital image or a video and a lens focusing the outside light to the image sensor module. However, the conventional camera module suffers from disadvantages of disablement of auto focus function to adjust a gap (distance) between the lens and the image sensor module, thereby making it difficult to obtain a high quality image.

However, a recently-developed camera module can adjust a gap (distance) between a lens and an image sensor module due to development of a VCM (Voice Coil Motor), whereby a user can obtain a desired high quality of image using the camera module mounted with the VCM.

The VCM capable of adjusting a gap between a lens and an image sensor module includes a rotor including a lens and a coil, a stator including a magnet, a base supporting the stator and a leaf spring elastically supporting the rotor.

The leaf spring of the VCM serves to elastically support the rotor and to apply a driving current to a coil block. The leaf spring is formed with a terminal unit bent for applying the driving current to the coil block, and when the terminal unit is bent to the leaf spring, a twist or heaving phenomenon is generated to the leaf spring, whereby the rotor is disadvantageously generated with a bad driving.

Accordingly, there is room for improvement in the VCM.

BRIEF SUMMARY

The present invention is directed to provide a VCM (Voice Coil Motor) configured to improve a structure of a leaf spring applying a driving signal to a coil block whereby a bad driving of a rotor caused by twist or heaving of the leaf spring can be inhibited.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, there is provided a VCM, the VCM comprising: a rotor having a first driving unit and arranged therein with a lens; a stator having a second driving unit wrapping the first driving unit and being opposite to the first driving unit; a base supporting the stator and having an opening formed at a position corresponding to that of the lens; a connection terminal including a pair of first and second connection terminals arranged at an upper surface of the base; and an elastic member including a first elastic member coupled to the rotor and electrically connected the first connection terminal and a second elastic member coupled to the rotor and electrically connected the second connection terminal.

The VCM according to the present disclosure has an advantageous effect in that an outside circuit board and an elastic member are not directly brought into contact, an connection terminal connected to the outside circuit board is formed at a base, and the elastic member fixing a rotor is coupled to the connection terminal using a separate connection member to inhibit the elastic member from being bent, tilted and heaved, whereby a bad driving of the rotor can be inhibited.

BRIEF DESCRIPTION OF THE DRAWINGS

In the drawings, the width, length, thickness, etc. of components may be exaggerated or reduced for the sake of convenience and clarity. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

The teachings of the present disclosure can be readily understood by considering the following detailed description in conjunction with the accompanying drawings, in which.

DETAILED DESCRIPTION

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, exemplary embodiments of a VCM (Voice Coil Motor) according to the present disclosure will be explained in detail together with the figures.

Figure 1:
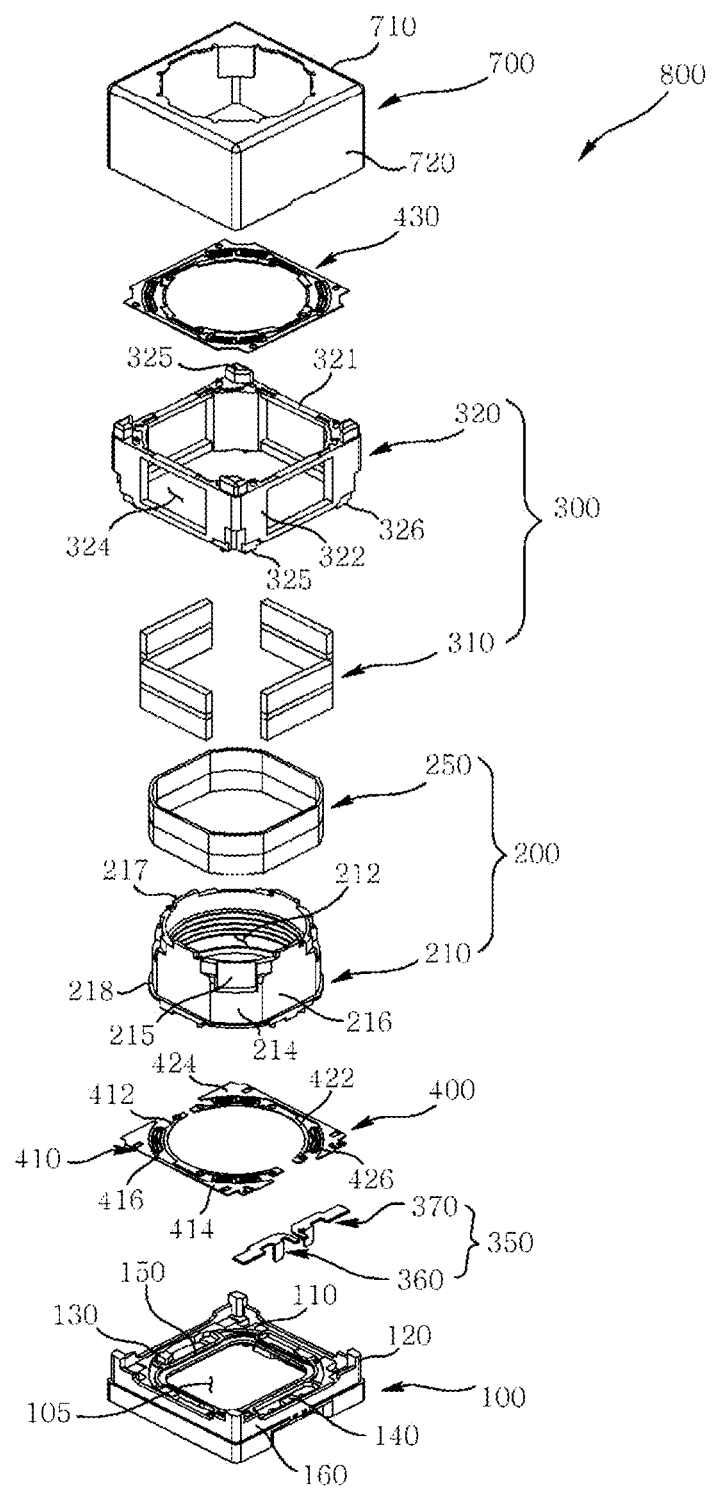
FIG. 1 is an exploded perspective view illustrating a VCM according to an exemplary embodiment of the present disclosure.
Figure 2:
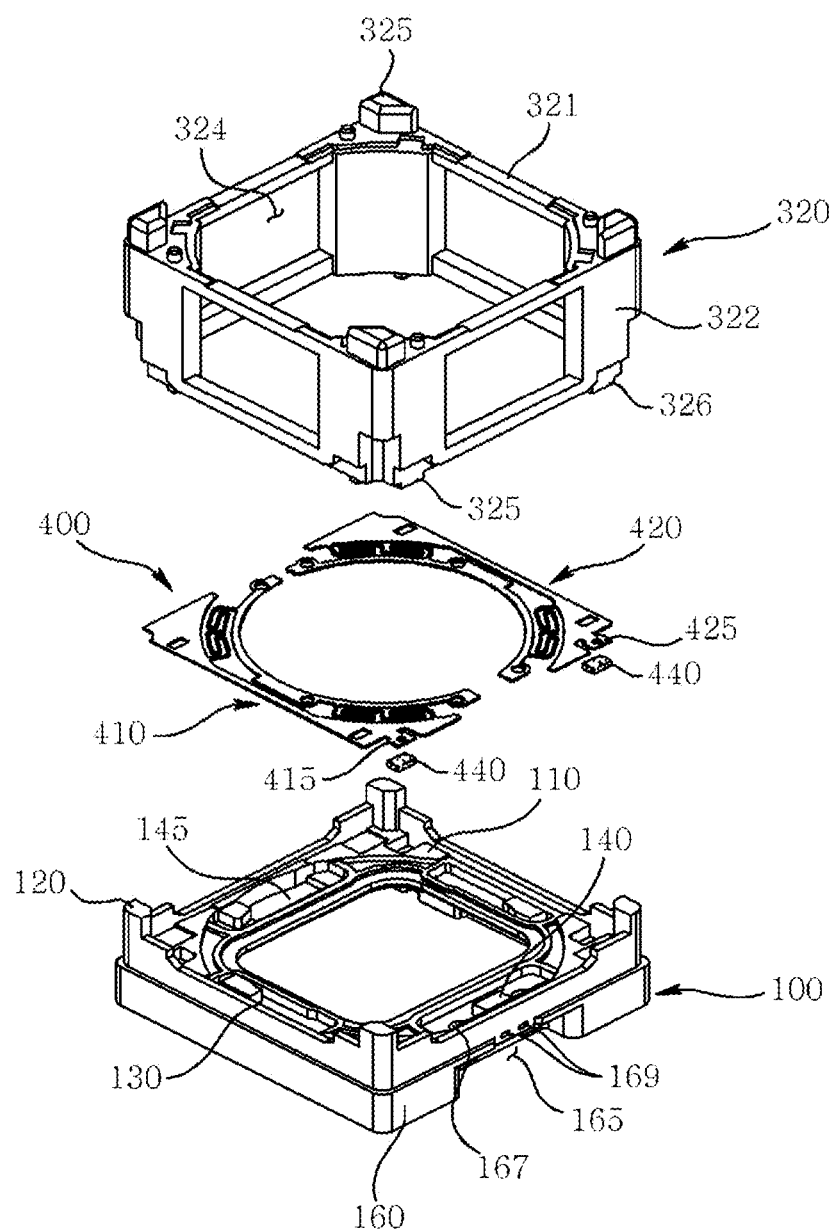
FIG. 2 is an exploded perspective view of a housing, an elastic member and a base of FIG. 1.

FIG. 1 is an exploded perspective view illustrating a VCM according to an exemplary embodiment of the present disclosure, FIG. 2 is an exploded perspective view of a housing, an elastic member and a base of FIG. 1.

Referring to FIGS. 1 and 2, the VCM (800) includes a base (100), a rotor (200), a stator (300), a connection terminal (350) and an elastic member (400). The VCM (800) may further include a cover can (700).

Referring to FIG. 1, the rotor includes a bobbin (210) and a first driving unit (250). The bobbin (210) takes a shape of a cylinder having a through hole (212), for example, and is coupled at an inner surface thereof to a lens (not shown), where the lens is driven along with the bobbin (210). The bobbin (210) is alternatively formed at an outer surface with a curved surface unit (214) and a planar surface unit (216), where four curved surface units (214) and four planar surface units (216) are alternatively formed at the outer surface of the bobbin (210) in an exemplary embodiment of the present disclosure.

The curved surface unit (214) formed at the outer surface of the bobbin (210) is formed with a bond tank (215) for fixing the first driving unit (250, described later), where the bond tank (215) is formed in a concave recess shape from the curved surface unit (214).

Although the exemplary embodiment of the present disclosure has illustrated and explained that the bond tank (215) is formed at the curved surface unit (214), the present disclosure is not limited thereto. For example, the bond tank (215) may be formed at the planar surface unit (216).

The bobbin (210) is formed at a bottom surface of outer surface of the bobbin (210) with a support unit (218) for supporting the first driving unit (250, described later), where the support unit (218) is protrusively formed in a shape of a ring along the bottom surface of the outer surface of the bobbin (210).

A part corresponding to the planar surface unit (216) in an upper surface of the bobbin (210) is protrusively formed with bosses (217). Each of the bosses (217) is protruded in the shape of a plate, and formed in parallel with the planar surface unit (216), for example.

The first driving unit (250) may include a coil block formed in a shape corresponding to that of the curved surface unit (214) and the planar surface unit (216) of the bobbin (210). The first driving unit (250) is formed by winding an insulated long resin-coated wire in a cylinder shape.

The first driving unit (250) may be wound on a winding apparatus to be inserted into an outer surface of the bobbin (210). Alternatively, the first driving unit (250) may be directly wound on the outer surface of the bobbin (210). The first driving unit (250) arranged at the outer surface of the bobbin (210) is fixed to the outer surface of the bobbin (210) using an adhesive provided to the bond tank (215). Both distal ends of the first driving unit (250) arranged at the outer surface of the bobbin (210) are respectively and electrically connected to the elastic member (400, described later).

Although the exemplary embodiment of the present disclosure has illustrated and explained that the first driving unit (250) is a coil block formed by winding a wire, it should be apparent that the first driving unit (250) may include a magnet.

The stator (300) includes a second driving unit (310) and a housing (320). The second driving unit (310) is arranged opposite to the first driving unit (250) wound on the bobbin (210). The second driving unit (310) in an exemplary embodiment of the present disclosure may include a magnet generating a magnetic field, for example.

The second driving unit (310) in an exemplary embodiment of the present disclosure may include a flat magnet formed in a plate shape, and four second driving units (310) are arranged at an ambience of the first driving unit (250), each vertically arranged to the ambience.

The housing (320) serves to fix the second driving unit (310) at a designated position. The housing (320) is formed in a shape of a bottom-opened cube. The housing (320) is formed at an upper plate (321) thereof with an opening exposing the rotor (200), and is also formed with a fixation lug (325).

Furthermore, each of lateral surfaces (322) of the housing (320) arrange opposite to the outer surface of the bobbin (210) are formed with an accommodation hole (324) for fixing the second driving unit (310), where the accommodation hole (324) is formed in a same size and shape as those of the second driving unit (310). Each of the lateral surfaces (322) of the housing (320) is formed with a coupling groove (326) coupled to a coupling pillar (120) of the base (described later). The coupling pillar of the base (100) and the coupling groove (326) are press-fitted to each other.

Although the exemplary embodiment of the present disclosure has illustrated and explained that the second driving unit (310) includes a magnet, the second driving unit (310) may include a coil block, in a case the first driving unit (250) includes a magnet.

Figure 3:
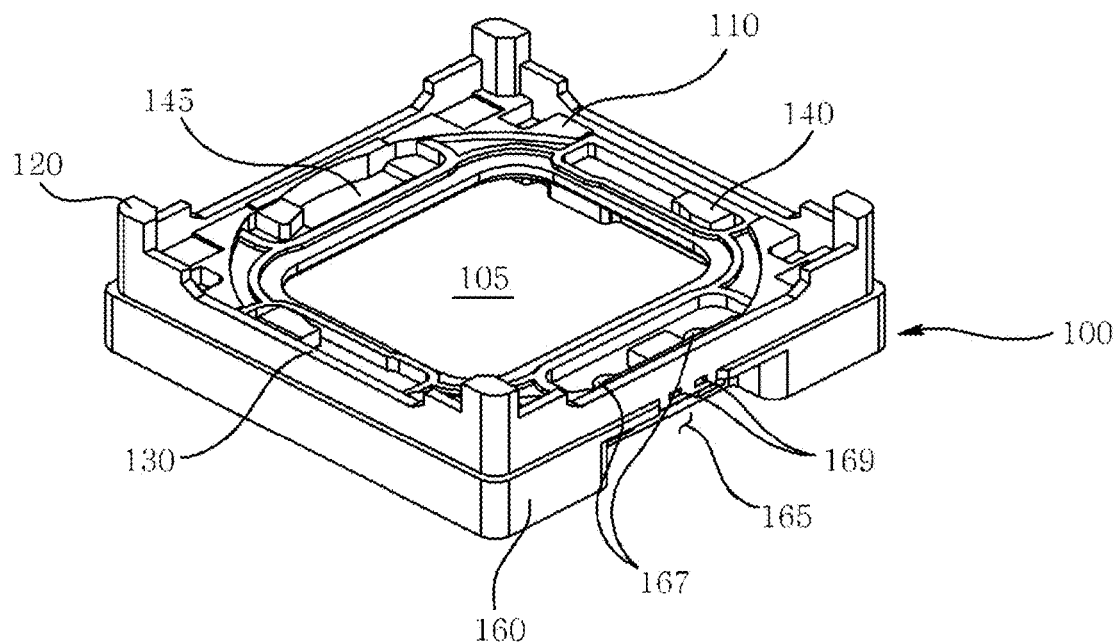
FIG. 3 is an extracted perspective view of a base of FIG. 1.

Referring to FIGS. 1 and 3, the base (100) serves to fix the elastic member (400, described later), the stator (300) and the cover can (700). The base is centrally formed with an opening (105) and takes a shape similar to a cubic plate, for example. The base (100) is mounted at a rear surface thereof with an IRCF (Infrared Cut Filter, not shown) shielding IR in the light introduced through the opening (105). Four corners of an upper surface (110) of the base (100) are respectively formed with four coupling pillars (120) protruded to a direction perpendicular to the upper surface (110) of the base (100), and coupled to the housing (320).

The base (100) is formed at an upper surface (110) with an edge unit (130) protruded from the upper surface (110) along the upper surface (110). The upper surface (110) of the base (100) is arranged to an area lower than the upper surface (110) of the base (100) by the edge unit (130), and outside foreign materials are inhibited from entering the opening (105) of the base (100) by the edge unit (130). An inner surface of the edge unit (130) protruded from the upper surface (110) of the base (100) is formed with four stopper units (140), for example.

Each stopper unit (140) is formed with a shape protruded inwards from an inner surface of the edge unit (130)

protruded from the upper surface (110) of the base (100), and each stopper unit (140) is brought into contact with a bottom surface of the bobbin (210) of the rotor (200, described later).

A foreign object scavenger unit (145) inhibiting foreign objects from entering the opening (105) is concavely formed at a position corresponding to that of the stopper unit (140) by being concavely formed from the upper surface (110) of the base (100). The foreign object scavenger unit (145) may be formed therein with a foreign object scavenger membrane such as an epoxy resin having a viscosity.

Referring to FIGS. 1 and 3 again, any one lateral surface (160) of lateral surfaces of the base (100) is formed with a groove (165) concavely formed from the lateral surface (160) of the base (100), and the base (100) is formed at the upper surface with a pair of terminal holes (167) communicating with the groove (165). Furthermore, any one lateral surface (160) of the base (10) formed with the groove (165) is formed with a fixation hole (169) passing through the lateral surface (160).

Figure 4:
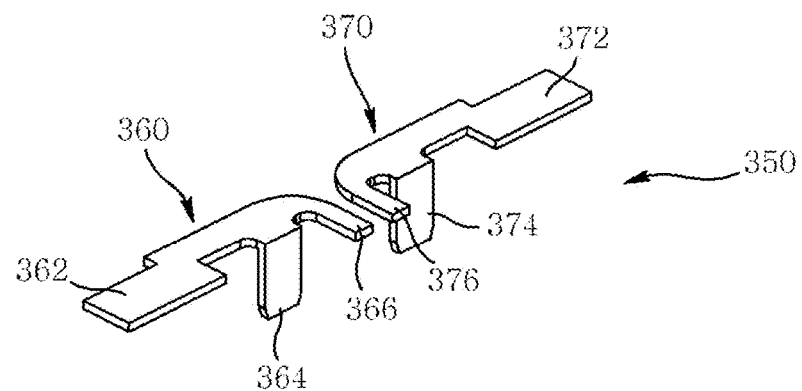
FIG. 4 is an extracted perspective view of a connection terminal of FIG. 1.

Referring to FIGS. 1 and 4, a connection terminal (350) is secured to a terminal hole (167) of the base (100) and the fixation hole (169). The connection terminal (350) includes a first connection terminal (360) and a second connection terminal (370). Each of the first and second connection terminals (360, 370) includes a conductive metal in an exemplary embodiment of the present disclosure.

The first and second connection terminals (360, 370) are symmetrically formed based on a space therebetween. Each of the first and second connection terminals (360, 370) includes first connection terminal units (362, 372), second connection terminal units (364, 374) and third connection terminal units (366, 376).

Each of the first connection terminal units (362, 372) is formed with a shape of a cubic plate arranged to a direction parallel with the upper surface (110) of the base (100), and electrically connected to the elastic member (400, described later). Each of the second connection terminal units (364, 374) is extended or bent to a direction perpendicular to each of the first connection terminal units (362, 372), and electrically connected to an outside circuit board that provides a driving signal. Each of the third connection terminal units (366, 376) is protruded in a shape of a bar from each of the first connection terminal units (362, 372) to a direction parallel with each of the first connection terminal units (362, 372), and serves to secure the each of the second connection terminal units (364, 374) to the base (100).

Each of the first connection terminal units (362, 372) of the first and second connection terminals (360, 370) at the connection terminal (350) is arranged on the upper surface (110) of the base (100), and is arranged in parallel with the elastic member (400, described later). Furthermore, each of the second connection terminal units (364, 374) of the first and second connection terminals (360, 370) at the connection terminal (350) passes through the terminal hole (167) of the base (100) and is exposed by the groove (165) of the base (100).

The each of the second connection terminal units (364, 374) exposed by the groove (165) is electrically connected to an outside circuit board that provides a driving signal. Still furthermore, each of the third connection terminal units (366, 376) of the first and second connection terminals (360, 370) at the connection terminal (350) is coupled to the fixation hole (169) formed at the lateral surface (160) of the base (100), and securely fixes the first and second connection terminals (360, 370) to the base (100). Meanwhile, the connection terminal (350) inclusive of the first and second connection terminals (360, 370) may be secured to the base (100) by an adhesive.

Figure 5:
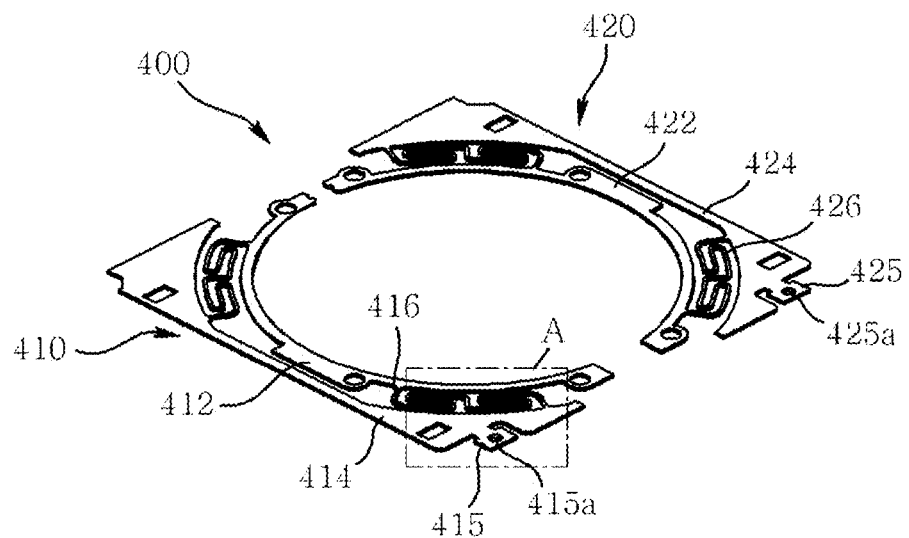
FIG. 5 is an extracted perspective view of an elastic member of FIG. 4.
Figure 6:
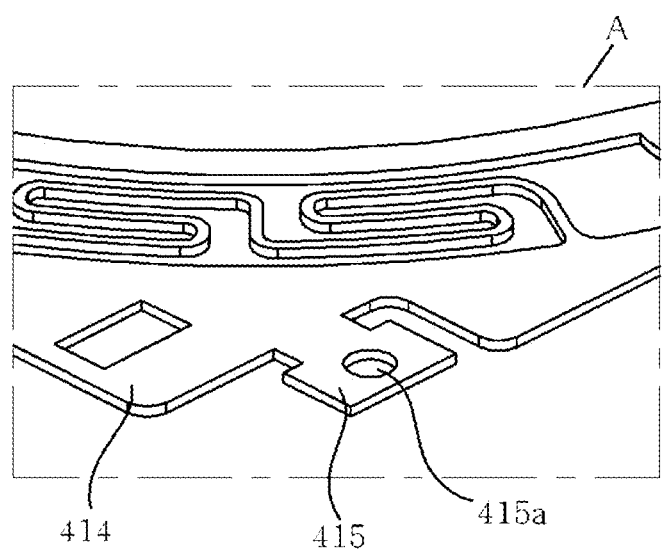
FIG. 6 is an enlarged view of 'A' of FIG. 5.

Now, referring to FIGS. 1, 5 and 6, the elastic member (400) performs a complex function of elastically supporting the rotor (200) and applying the driving signal received from the connection terminal (350) to the first driving unit (250) of the rotor (200). The elastic member (400) includes a first elastic member (410) and a second elastic member (420). The elastic member (400) may further include a third elastic member (430) as shown in FIG. 1.

Each of the first and second elastic members (410, 420) is coupled to a bottom surface of the bobbin (210) of the rotor (200), and the third elastic member (430) is coupled to an upper surface opposite to the bottom surface of the bobbin (210) of the rotor (200). The first elastic member (410) in an exemplary embodiment of the present disclosure is electrically connected to the first connection terminal (360), and the second elastic member (420) is electrically connected to the second connection terminal (370).

Meanwhile, the first and second elastic members (410, 420) coupled to the bottom surface of the bobbin (210) of the rotor (200) is electrically insulated from each other. Each of the mutually insulated first and second elastic members (410, 420) includes an inner elastic units (412, 422), outer elastic units (414, 424) and connection elastic units (416, 426).

The inner elastic units (412, 422) are coupled to the bottom surface of the bobbin (210) of the rotor (200). The outer elastic units (414, 424) are arranged at an outside of the inner elastic units (412, 422), arranged at the upper surface (110) of the base (100), and fixed by the housing (320) of the stator (300), for example. The connection elastic units (416, 426) serve to elastically connect the inner elastic units (412, 422) and the outer elastic units (414, 424).

In an exemplary embodiment of the present disclosure, a part of each of the outer elastic units (414, 424) is electrically connected to the first and second connection terminals (360, 370) of the connection terminal (350) arranged on the base (100).

Referring to FIG. 2 again, each of the outer elastic units (414, 424) of the first and second elastic members (410, 420), and the first and second connection terminals (360, 370) of the connection terminal (350) opposite to each of the outer elastic units (414, 424) are electrically connected by a conductive material (440). The conductive material (440) interposed between the first connection terminal (360) and the outer elastic unit (414) of the first elastic member (410) and between the second connection terminal (370) and the outer elastic unit (424) of the second elastic member (420) may include a conductive resin or a solder paste. Alternatively, the conductive material (440) may include various other conductive materials each having flexibility.

Meanwhile, in order to further improve electrical connection characteristics of the first elastic member (410) and the first connection terminal (360), and to inhibit the first elastic member (410) from being twisted, tilted and heaved, the outer elastic unit (414) of the first elastic member (410) is formed with a first connection unit (415) protruded from the outer elastic unit (414).

An area joined or met by the first connection unit (415) and the outer elastic unit (414) is formed with a neck a bit more reduced in terms of area space than the first connection unit (415) in order to facilitate the bending of the first connection unit (415). Furthermore, the first connection unit (415) may be formed with a through hole (415a) in order to improve a binding force between the first connection unit (415) and the conductive material (440).

Meanwhile, in order to further improve electrical connection characteristics of the second elastic member (420) and the second connection terminal (370), and to inhibit the second elastic member (420) from being twisted, tilted and heaved, the outer elastic unit (424) of the second elastic member (410) is formed with a second connection unit (425) protruded from the outer elastic unit (424).

An area joined or met by the second connection unit (425) and the outer elastic unit (424) is formed with a neck a bit more reduced in terms of area space than the second connection unit (425) in order to facilitate the bending of the second connection unit (415). Furthermore, the second connection unit (425) may be formed with a through hole (425*a*) in order to improve a binding force between the second connection unit (425) and the conductive material (440).

In an exemplary embodiment of the present disclosure, the first connection unit (415) may be bent towards the first connection terminal (360) in order to inhibit the connection defects of the first connection unit (415) of the first elastic member (410), the conductive material (440) and the first connection terminal (360).

At this time, in a case the first connection unit (415) is bent towards to the first connection terminal (360), the outer elastic unit (414) is depressed by the housing (320) in order to inhibit the outer elastic unit (414) of the first elastic member (410) from being twisted, tilted and heaved.

Figure 7:
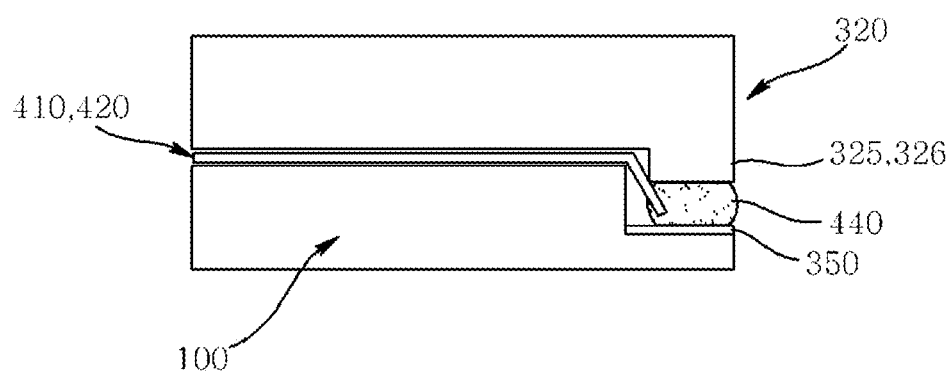
FIG. 7 is a cross-sectional view illustrating an electric connection between a connection terminal and an elastic member of FIG. 1.

Referring to FIGS. 1 and 7, in order to allow the first connection unit (415) to be bent towards the first connection terminal (360), a portion corresponding to the first connection unit in the bottom surface of the housing (320) of the stator (300) is formed with a lug (325) depressing the first connection unit (415).

The second connection unit (425) may be bent towards the second connection terminal (370) in order to inhibit the connection defects of the second connection unit (425) of the second elastic member (420), the conductive material (440) and the second connection terminal (370).

At this time, in a case the second connection unit (425) is bent towards to the second connection terminal (370), the outer elastic unit (424) of the second elastic member (420) is depressed by the housing (320) in order to inhibit the outer elastic unit (424) of the second elastic member (420) from being twisted, tilted and heaved.

Referring to FIGS. 1 and 7, in order to allow the second connection unit (425) to be bent towards the second connection terminal (370), a portion corresponding to the second connection unit (425) in the bottom surface of the housing (320) of the stator (300) is formed with a lug (326) depressing the first connection unit (425).

Figure 8:
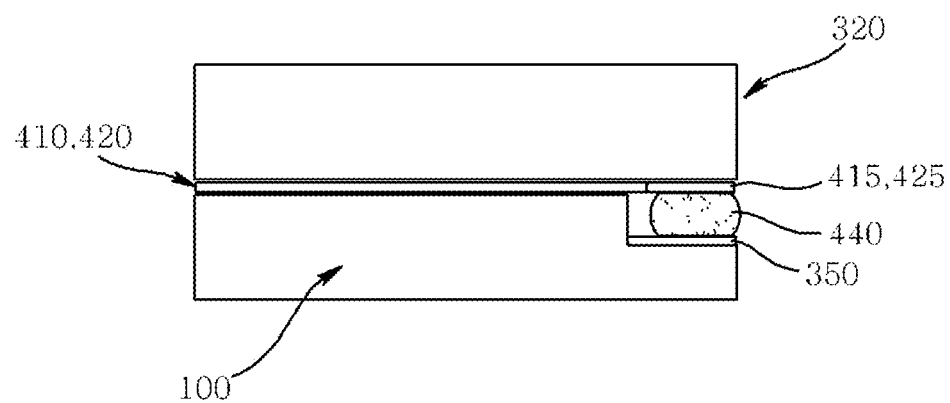
FIG. 8 is a cross-sectional view illustrating an electric connection between a connection terminal and an elastic member according to another exemplary embodiment of the present disclosure.

Although the exemplary embodiment of the present disclosure has illustrated and explained that the first and second connection units (415, 425) are bent by forming lugs (325, 326) at the bottom surface of the housing (320) as shown in FIG. 7, alternatively, the first and second connection units (415, 425) may be formed in parallel with the first and second connection terminals (360, 370) as illustrated in FIG. 8.

The cover can (700) may include a cover can upper plate (710) and a cover can lateral plate (720), where the cover can lateral plate (720) is coupled to the base (100).

The above-mentioned VCM according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

Meantime, the VCM according to the present disclosure has an industrial applicability in that an outside circuit board and an elastic member are not directly brought into contact, an connection terminal connected to the outside circuit board is formed at a base, and the elastic member fixing a rotor is coupled to the connection terminal using a separate connection member to inhibit the elastic member from being bent, tilted and heaved, whereby a bad driving of the rotor can be inhibited.

The invention claimed is:

1. A VCM (Voice Coil Motor), the VCM comprising:
   a mover including a bobbin, and a first driving unit coupled to the bobbin;
   a second driving unit being opposite to the first driving unit;
   a base disposed under the mover;
   a connection terminal disposed at the base; and
   an elastic member coupled to the mover and the base,
   wherein the connection terminal includes a first connection terminal and a second connection terminal separated from the first connection terminal,
   wherein the elastic member includes a first elastic member and a second elastic member separated from the first elastic member, and
   wherein the first connection terminal comprises:
   a plate part coupled to the base and elongated along a first direction;
   a first part downwardly bent in a second direction from the plate part; and
   a second part protruding in a third direction from the plate part,
   wherein the second part is inserted into the base, and
   wherein the base comprises a first recess in which the plate part of the first connection terminal is disposed.

2. The VCM of claim 1, wherein the width of the plate part in a first direction is wider than the width of the second part in a first direction.

3. The VCM of claim 1, wherein the second direction is perpendicular to the first direction, and
   wherein the third direction is perpendicular to the first direction and the second direction.

4. The VCM of claim 1, wherein the first elastic member is electrically connected to the first connection terminal, and the second elastic member is electrically connected to the second connection terminal, and
   wherein at least a portion of the first part of the first connection terminal is exposed outside of the base.

5. The VCM of claim 1, wherein the first part of the first connection terminal is disposed in and exposed at a second recess formed on a lateral surface of the base.

6. The VCM of claim 1, wherein an upper surface of the plate part of the first connection terminal lies in a same plane as an upper surface of the second part of the first connection terminal.

7. The VCM of claim 1, further comprising:
   a conductive material disposed both between the first elastic member and the first connection terminal and between the second elastic member and the second connection terminal, wherein the conductive material includes at least one of a conductive resin and a solder paste.

8. The VCM of claim 1, wherein the first connection terminal is overlapped with the first elastic member in a vertical direction, and the second connection terminal is overlapped with the second elastic member in the vertical direction.

9. The VCM of claim 7, wherein a portion of the first elastic member faces a portion of the first connection terminal, and a first gap is formed between the portion of the first elastic member and the portion of the first connection terminal; and
a portion of the second elastic member faces a portion of the second connection terminal, and a second gap is formed between the portion of the second elastic member and the portion of the second connection terminal.

10. The VCM of claim 9, wherein the conductive material is disposed in the first gap and the second gap.

11. The VCM of claim 1, wherein an upper surface of the base comprises a plurality of stoppers supporting a lower surface of the mover, and a foreign object scavenger unit is concavely formed around the stoppers.

12. The VCM of claim 11, wherein the foreign object scavenger unit is formed with a foreign object scavenger membrane having a viscosity.

13. A camera module comprising an image sensor, a circuit board, a lens, and a VCM,
wherein the VCM comprises:
a mover including a bobbin, and a first driving unit coupled to the bobbin;
a second driving unit being opposite to the first driving unit;
a base disposed under the mover;
a connection terminal disposed at the base; and
an elastic member coupled to the mover and the base,
wherein the connection terminal includes a first connection terminal and a second connection terminal separated from the first connection terminal,
wherein the elastic member includes a first elastic member and a second elastic member separated from the first elastic member,
wherein the first elastic member is electrically connected to the first connection terminal, and the second elastic member is electrically connected to the second connection terminal,
wherein the first connection terminals comprise:
a plate part coupled to the base and elongated along a first direction;
a first part downwardly bent in a second direction from the plate part; and
a second part protruding in a third direction from the plate part,
wherein the second part is inserted into the base,
wherein the base comprises a recess in which the plate part of the first connection terminal is disposed, and
wherein the first part of first connection terminal is electrically connected to the circuit board.

14. The VCM of claim 1, wherein the first and second connection terminals are symmetrically formed.

15. The VCM of claim 1, wherein the plate part of the first connection terminal is elongated along the lateral surface of the base.

16. The VCM of claim 1, wherein an upper surface of the plate part is parallel to an upper surface of the base,
wherein the first part is vertically extended from the plate part, and
wherein the second part is horizontally extended from the plate part.

17. The VCM of claim 1, wherein the second part of the first connection terminal is perpendicular to the first part of the first connection terminal.

18. The VCM of claim 1, wherein the base comprises a coupling portion formed on a surface of the base and coupled with the second part of the first connection terminal, and
wherein the second part of the first connection terminal is inserted into the coupling portion of the base in a horizontal direction.

19. The VCM of claim 18, wherein the coupling portion is a hole.

20. The VCM of claim 1, wherein each of the first and second connection terminals is secured to the base by an adhesive,
wherein the first recess is recessed from an upper surface of the base,
wherein at least a portion of the first part is disposed on the first recess, and
wherein at least a portion of the plate part of the first connection terminal is overlapped with the first elastic member.

* * * * *